United States Patent [19]

Kasabian

[11] 3,807,815
[45] Apr. 30, 1974

[54] BEARING SYSTEMS
[75] Inventor: Jack Kasabian, Franksville, Wis.
[73] Assignee: Rockwell International Corporation, Pittsburgh, Pa.
[22] Filed: Mar. 6, 1972
[21] Appl. No.: 232,155

[52] U.S. Cl. .............................................. 308/189
[51] Int. Cl. ............................................ F16c 25/06
[58] Field of Search ...... 308/189, 189.1, 207, 207.1

[56] References Cited
UNITED STATES PATENTS
1,452,603  4/1923  Himes ........................... 308/189 A
2,696,569  12/1954  Schumann ...................... 308/189 R FOREIGN PATENTS OR APPLICATIONS
554,510  3/1923  France ........................... 308/189 R
582,962  9/1933  Germany ........................ 308/207 R

OTHER PUBLICATIONS

Preloaded Bearings; Product Engineering, July 19, 1965, Pages 84–94 relied upon.

Primary Examiner—Charles J. Myhre
Assistant Examiner—Frank Susko

[57]  ABSTRACT

Preloaded bearing assemblies with provision for accommodating thermal expansion induced and other changes in dimensions and for equally loading the bearings of a multiple bearing cluster together with tools employing and methods of providing such bearing systems.

16 Claims, 3 Drawing Figures

BEARING SYSTEMS

This invention relates to bearing systems and, more specifically, to novel, improved, preloaded bearing systems for supporting shafts, quills, and other rotatable components in housings and other structures.

The bearing systems of the present invention are particularly useful in high speed power tools and the principles of the present invention will be developed primarily by reference to this application of my invention. However, it is to be understood that this is solely for the sake of convenience and clarity and is not intended to limit the scope of protection to which I consider myself entitled.

One class of tools of the type referred to in the preceding paragraph includes a casing housing an electric or pneumatic motor and a quill or spindle to which a chuck or other accessory retaining device can be attached,[1,2] attached (the term "accessory" as used herein is intended to embrace work-performing components such as drills, milling and grinding tools, routers, deburring tools, boring tools, saws, abrasive tools, polishing and other finishing tools, cutoff tools, etc., as well as other accessories which are typically mounted in chucks and collets such as flexible shafts, speed reducers, and angle drives, for example), the quill or spindle being axially aligned with the motor output shaft. The quill is rotatably supported in the casing by rolling contact bearings located generally at opposite ends of the quill with two bearings typically being employed at the front end of the quill. The quill is connected to the motor output shaft and therefore rotated by the motor of the tool.

Such tools are known in the trade as "power quills." Power quills are described and illustrated in detail in U. S. Pat. Nos. 2,532,823 and 2,696,569 issued to Schumann Dec. 5, 1949, and Dec. 2, 1954, respectively.

In the method heretofore employed to assemble power quills, bearings having an inner bore matching the diameter of quill are selected. The assembler installs a rear bearing, two front bearings, and a preload spacer which spans and engages the outer races of the closest front and rear bearings. As the front bearings are installed, one or more shims are inserted between the inner races of the bearings to eliminate the estimated axial play or displacement of the inner races relative to the outer races. A clamping ring (typically a slinger) is threaded into the front end of the housing after the components of the bearing system have been installed to bias the outer races of the bearing into contact with each other and the spacer and against an annular abutment adjacent the rear bearing. This preloads the rolling bearing elements to eliminate end play in the quill, which is necessary for accurate drilling and other operations.

The major disadvantage of the bearing system just described is that it is not possible to preload the bearings to a specific degree. Tests in some cases show that, as a consequence, there is no preloading at all, making the bearing assembly incapable of functioning in the intended manner.

In other cases, the loading on the bearing is too high, which also results in unsatisfactory operation. This is because the bearing-spacer assembly becomes rigid when it is clamped in place and the components between which the assembly is confined are also rigid. As a result, thermal expansion of the bearing assembly during operation of th tool can increase the loading on the bearing by as much as an order of magnitude. The result is additional generation of heat and early bearing failure, especially if the loading is initially too high.

These problems are compounded because the axial play of the inner races relative to the outer races in the two front bearings will typically not be equal. Consequently, when the slinger or other member is tightened to clamp the bearings in place, these two bearings will be loaded to different degrees. As a result, the entire axial force generated by the clamping member may in the extreme case be applied to one bearing while the other bearing (or bearings) is not loaded at all.

In conjunction with the foregoing, overloading of the bearings is in many cases detected in a run-in test and can be corrected. However, even if it is, the assembler must partially disassemble the tool, remove (or remove and replace) one or more shims, reassemble the tool, and repeat the run-in test. Accordingly, even if overloading is detected, correction of the condition involves a significant loss of time, which is disadvantageous from an economic point-of-view.

I have now invented a novel bearing system and technique for installing bearings which eliminate the problems discussed above. In installing bearings in a power quill or the like in accord with the present invention the rear bearing is put in place as in the system described above, and front bearings which have equal play of their inner races relative to their outer races in at least the direction toward the front of the tool are installed on the quill. The bearings are followed by an axially displaceable retaining ring, inner and outer spacers, and a loading unit which is engageable with the inner spacer and the inner race of the rear bearing.

The quill and components assembled on it are then installed, and the slinger or other clamping member is tightened against the outer race of the forwardmost bearing, clamping the outer races of the bearings and the outer spacer in place. As this is done, the inner races of the bearings are also shown together, elastically deforming the annular loading unit. Accordingly, the latter exerts axially directed forces on the inner races of the front and rear bearings, displacing them relative to the outer races of and thereby loading the bearings.

Because the front bearings have equal axial play in the direction in which the axial force is exerted, the loads on these bearings are equal, thus eliminating the problems appurtenant to unequally loaded bearings.

Also, the resilient loading unit is elastically deformed to reduce its axial length as the inner bearing races expand axially relative to the outer races because of temperature increases or for any other reason. This produces only a small increase in the axial force which the loading unit exerts on the inner bearing races. Consequently, temperature induced and other axial increases in dimension of the bearings result only in increases in the loading on the bearings which have a small magnitude and do not adversely effect their service life.

Conversely, if there is a decrease in the axial dimensions of one or more of the bearing components, the loading unit will expand toward its original configuration to keep the bearings loaded.

A further and related advantage is that the loading unit is similarly capable of compensating for the variations in length which the components of the bearing system will have because of manufacturing tolerances.

From the foregoing it will be apparent that one primary object of the present invention resides in the provision of novel, improved, preloaded bearing systems or arrangements for power tool and other applications.

Other important objects of the invention reside in the provision of bearing systems or assemblies in accord with the preceding object:
1. which include at least one multiple bearing cluster and which are so designed that all of the bearings in the cluster are equally loaded.
2. which include a unit of one or more components for loading the bearings thereof, the unit being capable of elastically yielding and thereby keeping thermal expansion and contraction induced and other dimensional changes from creating excessive loads on the bearings and/or from reducing the loads on the bearings to unsatisfactorily low levels.
3. which have long service lives.
4. which have the capacity for reducing assembly costs.
5. which are capable of providing preloading that does not vary by an extent which is significant from a practical point-of-view from assembly to assembly despite the variations in the dimensions of the components allowed by manufacturing tolerances.
6. which have various combinations of the foregoing attributes.

Yet another important object of the present invention resides in the provision of methods for producing bearing systems having the foregoing attributes and various combinations thereof.

Still other objects and advantages and further novel features of the present invention will become apparent from the appended claims and as the ensuing detailed description and discussion proceeds in conjunction with the accompanying drawing, in which:

Figure 1:
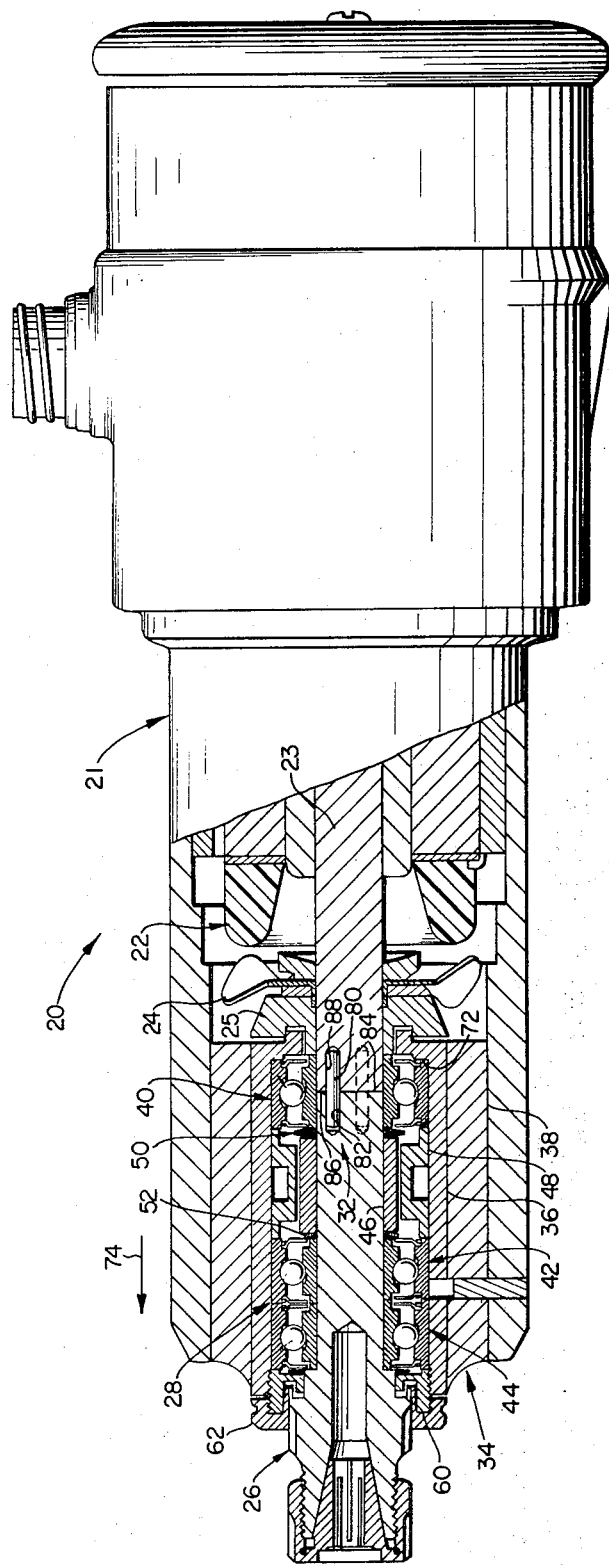
FIG. 1 is an elevation of a power quill equipped with a bearing system which embodies and is constructed in accord with the principles of the present invention, part of the external casing of the power quill being broken away to show the components of the bearing system and other internal components of the power quill.

Referring now to the drawing, FIG. 1 shows a power quill 20 including a casing 21 housing a motor 22 having an output shaft 23 carrying a fan 24 and a slinger 25, a quill 26 to which a drill bit or other accessory can be attached, and a bearing system 28 in accord with the principles of the present invention for rotatably supporting quill 26 in and from casing 21. Quill 26 is axially aligned with the shaft 23 of motor 22 and is fixed to the shaft for rotation therewith by coupling 32.

To a considerable extent, power quill 20 is of a commercially available being basically a Model Super 65 which is available from the Precise Products Division of Rockwell Manufacturing Co. The illustrated construction in addition, is described in the patent literature (see U.S. Pat. No. 2,696,569). The power quill will accordingly not be described herein except to the extent necessary to provide a setting for and an understanding of the present invention.

Figure 2:
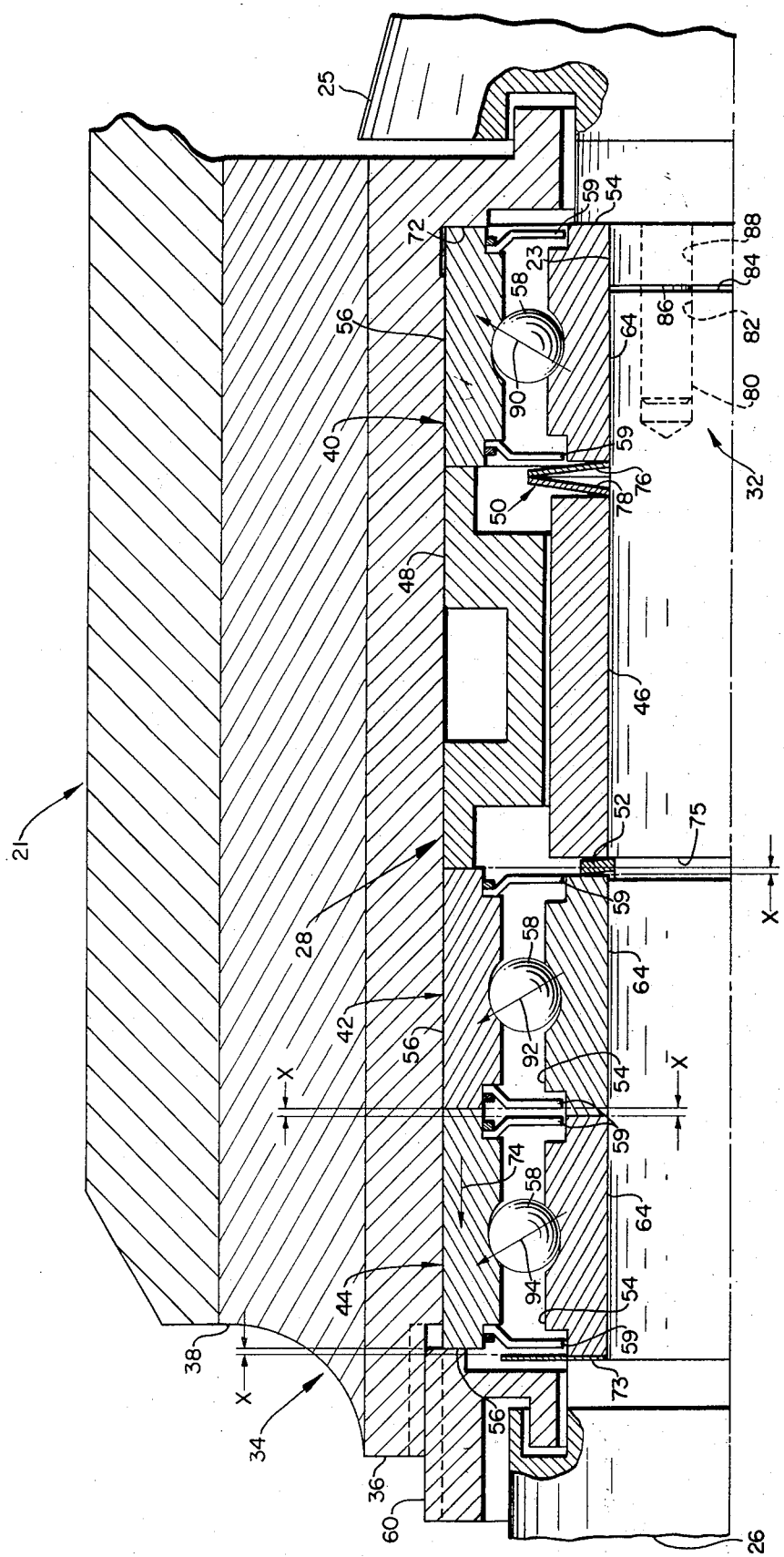
FIG. 2 is a fragment of FIG. 1 to an enlarged scale.

Referring now to both FIGS. 1 and 2, a cylindrical quill housing 34 including inner and outer members 36 and 38 is fitted within the main casing 21 of the power quill, and quill 26 is rotatably supported in housing 34 by the bearing system 28 mentioned previously. The bearing system includes a rear bearing 40, a front cluster of bearings 42 and 44, inner and outer spacers 46 and 48, a bearing loading unit 50, and a bowed retaining ring 52. All three bearings, which are identical, are of the conventional, rolling contact type and include an inner race 54, an outer race 56, a plurality of balls 58 or other rolling elements between the inner and outer races, and shields 59. The components of the bearing system are retained in place and the bearings preloaded by a clamping ring or slinger 60 threaded into the front end of quill housing inner member 36. A dust cap 62 threaded onto slinger 60 keeps foreign material from penetrating to the interior of casing 21 through the front end of the tool.

The first step in installing a bearing system in accord with the principles of the present invention is to select bearings in which the axial displacement or play of the inner races 54 relative to the outer races 56 is equal in at least one direction. Also, the inner diameter 64 of the inner races must match the outer diameter of quill 26 and motor output shaft 23.

Figure 3:
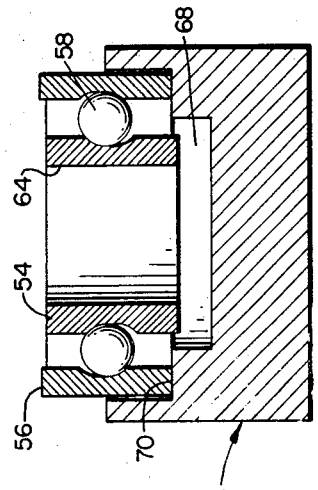
FIG. 3 is a section through a fixture employed in matching bearings for use in bearing systems in accord with the present invention.

The play of the bearings can be readily measured by employing the simple jig 66 illustrated in FIG. 3. This jig is a block of material having a stepped cavity 68, which provides a horizontal ledge 70. When a bearing is placed in the cavity, its outer race 56 rests on ledge 70; and its inner race is unsupported, allowing it to drop downwardly relative to the outer race as shown in FIG. 3. The amount of this no-load axial play or displacement is measured with a dial indicator or the like, typically to the nearest one ten-thousandths of an inch. The bearing is then turned over and the process repeated.

Once two bearings having equal axial displacement in at least one direction and appropriate inner diameters have been identified, the bearing system 28 of the tool can be assembled. The first step is to insert the rear bearing 40 which is slid into the inner member 36 of quill housing 34 until its outer race 56 abuts an inwardly projecting abutment 72 at the rear end of member 36. For reasons which will become apparent hereinafter, the inner race 54 of this bearing is preferably so dimensioned as to have a press fit with motor output shaft 23, which terminates at approximately the midpoint of the inner race.

The remaining components of the bearing system are then assembled on quill 26. Specifically, clamping ring 60 is first slid onto the quill. This is followed by a dust washer 73, front bearings 42 and 44, which are installed so that the axial play or displacement x in the direction indicated by arrow 74 in FIGS. 1 and 2 is equal. The bowed retaining ring 52 is installed next in a circumferential groove 75 in quill 26.

Next to be installed on the quill are inner and outer bearing spacers 46 and 48. These are followed by the loading unit 50.

In the illustrated embodiment of the invention, the loading unit consists of two Belleville springs 76 and 78 disposed in mirror image relationship with the concave sides of the spring facing. As best shown in FIG. 2, these springs are dimensioned so that they are engaged by inner spacer 46 and the inner race 54 of rear bearing 40, but not by the outer spacer 48 or outer bearing race 56.

After the loading unit components are in place, loosely fitting pins 80 are installed in axial apertures 82 opening onto the rear end 84 of quill 26.

The quill 26 and the components assembled on it are then inserted in the inner member 36 of quill housing 34 and slid rearwardly in the latter until the rear end 84 of the quill abuts the front end 86 of motor output shaft 23 with pins 80 extending into axial recesses 88, which open onto the front end 86 of the motor output shaft.

As in the case of the motor output shaft, the relation between the quill and the inner race 54 of rear bearing 40 is preferably a press fit. Thus, the inner race of the bearing axially aligns the two shafts with the pins 80 providing a drive connection therebetween without exerting on the shafts any forces which would tend to misalign them.

Referring again to FIGS. 1 and 2, after quill 26 is installed, clamping ring 60, which engages the outer race 56 of the forwardmost bearing 44 and is threaded into quill housing inner member 36, is tightened, biasing the outer races of the bearings and outer spacer 48 toward the rear of the tool against abutment 72. This locks the three outer bearing races and the outer spacer into a rigid assembly, fixing them against axial movement relative to each other and to the housing of the tool.

As the outer bearing races and spacer are drawn together by the tightening of the clamping ring, the distance between the inner race 54 of rear bearing 40 on the one hand and inner spacer 46 and the inner races of front bearings 42 and 44 on the other also tends to decrease, elastically displacing the two springs 76 and 78 of loading unit 50 toward each other. The springs accordingly exert axially directed reactive forces which tend to displace the inner race 54 of rear bearing 40 rearwardly and the inner races 54 of the two front bearings 42 and 44 in the opposite direction, loading the bearings in the directions indicated by arrows 90, 92, and 94 in FIG. 2.

Because the play of the two front bearings 42 and 44 is equal in the direction indicated by arrow 74, the two bearings are equally loaded by springs 76 and 78. Thus, the problems caused by unequal loading of multiple bearings in the type of tool to which the invention relates are avoided.

Also, springs 76 and 78 accommodate differences in axial dimensions attributable to variations in manufacturing tolerances, making it possible to readily impart loads which do not vary to a significant extent from the practical point-of-view despite variations in the dimensions in the parts.

Springs 76 and 78 also accommodate thermally induced and other axial changes in the dimensions of the system by deforming toward and away from each other to maintain a loading on the bearings despite dimensional changes. Again, while such expansion and contraction of the loading unit components will vary the magnitude of the loading, the change is not significant from a practical point-of-view.

It will be apparent from the foregoing that the principles of the present invention are applicable to a wide variety of mechanical devices in addition to the specific tool illustrated in the drawing and discussed above. To the extent that such additional applications are not expressly excluded from the appended claims, they are fully intended to be covered therein.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The combination of a support structure; a component; and means for rotatably supporting said component in and from said support structure comprising bearings at first and second locations spaced along said component, each said bearing comprising an outer race, an inner race surrounding the component, and rolling elements between the inner and outer races; means fixing said outer races relative to each other and to said support structure in the axial direction, and means surrounding said component between said first and second locations for axially biasing all of the inner races at said first and second locations in opposite directions and relative to the outer races of the bearings at both of said first and second locations to preload the bearing elements between the inner and outer races of the bearings at both of said first and second locations, said biasing means being elastically yieldable in the axial direction to permit relative movement between the inner races of the bearings at said first and second locations in said axial direction, thereby accommodating thermal expansion of and other axial changes of dimension in said bearings to keep such dimensional changes from creating excessive loads on the bearings or from reducing the preload on the bearings to an unacceptable extent.

2. The combination of a support structure; a component; and means for rotatably supporting said component in and from said support structure comprising bearings at locations spaced along said component, there being plural bearings at one of said locations and each of said bearings comprising an outer race, an inner race surrounding the supported component, and rolling element between the inner and outer races; means fixing said outer races relative to each other and to said support structure in the axial direction; and means between the locations for axially biasing said inner races relative to said outer races to preload the rolling elements therebetween, said means biasing all inner races of the bearings at said one location in the same direction relative to the outer races and the axial play of the inner races of all bearings at said one location relative to the outer races thereof being equal in the direction in which the inner races are biased, whereby all of the bearings at said one location will be equally loaded.

3. The combination of claim 2, wherein said biasing means is elastically yieldable in the axial direction to thereby accommodate thermal expansion of and other axial changes of dimension in said bearings and keep such dimensional changes from creating excessive loads on the bearings.

4. The combination of a support structure; abutment means in said support structure; a component; and means for rotatably supporting said component in and from said support structure which comprises bearings at first and second locations spaced along said component with said bearings each having an inner race, an outer race, and rolling elements therebetween; a first spacer means which extends between the first and second locations and is engageable with the outer races of the bearings thereat; means biasing said outer bearing races and said spacer means toward and against the abutment means to fix said outer races relative to each other and to said support structure; a second spacer means which is axially movable independently of the first spacer means extending between said first and second bearing locations in alignment with the inner races of the bearings thereat; and means between said second spacer means and one of the inner bearing races juxtaposed thereto for axially biasing all of the inner races at said first and second locations in opposite directions and relative to the outer races of the bearings at both of said first and second locations to preload the rolling elements between the inner and outer races of the bearings at both of said first and second locations, said last mentioned means being elastically yieldable in the axial direction to permit said inner races to move relative to each other in said axial direction, thereby accommodating thermal expansion of and other dimensional changes of said bearings in the axial direction to keep said dimensional changes from causing excessive loading of said bearing members or from reducing the preload on the bearings to an unacceptable extent.

5. The combination of claim 4, wherein there are plural bearings at one of said locations and wherein the axial play of the inner races of all bearings at said one location relative to the outer races thereof in the direction in which said inner races are biased is equal, whereby the bearings at said one location are equally loaded by said biasing means.

6. A power tool comprising a housing; a motor having an output shaft, said motor being mounted in said housing; a spindle; means rotatably mounting said spindle in said housing in axial alignment with said motor output shaft comprising bearings having an inner race, an outer race, and rolling elements therebetween at first and second locations along said spindle with the inner races thereof surrounding the spindle, means fixing the outer races of the bearings relative to the housing, and means surrounding said spindle between said first and second bearing locations for axially biasing the inner races at said first and second locations in opposite directions and relative to the outer races at both of said locations to preload the rolling elements between the inner and outer races of the bearings at said first and second locations, said biasing means being elastically yieldable axially of the spindle to permit the inner races of the bearings to move relative to each other in the axial direction, thereby accommodating thermal expansion of and other axial changes of dimension in said bearings to keep said dimensional changes from creating excessive loads on the bearings or from reducing the preload on the bearings to an unacceptable extent; and means fixing said spindle to said motor output shaft for rotation therewith.

7. A power tool comprising a housing; a motor having an output shaft, said motor being mounted in said housing; a spindle; means rotatably mounting said spindle in said housing in axial alignment with said motor output shaft comprising bearings at locations spaced along said spindle, there being plural bearings at one of said locations and each of said bearings comprising an outer race, an inner race surrounding the spindle, and rolling bearing elements between the inner and outer races; means fixing said outer races relative to said housing in the axial direction; and means for axially biasing said inner races relative to said outer races to preload the rolling elements therebetween and for said means biasing all inner races of the bearings at said one location in the same direction relative to the outer races and the axial play of the inner races of all bearings at said one location relative to the outer races in the direction in which said inner races are biased being equal, whereby all of the bearings at said first location will be equally loaded; and means fixing said spindle to said motor output shaft for rotation therewith.

8. The power tool of claim 8, wherein said biasing means is elastically yieldable in the axial direction to thereby accommodate thermal expansion of and other axial changes of dimension in said bearings and keep said dimensional changes from creating excessive loads on the bearings.

9. A power tool comprising a housing; a motor having an output shaft, said motor being mounted in said housing; a spindle; means rotatably mounting said spindle in said housing in axial alignment with said motor output shaft comprising bearings having an inner race, an outer race, and rolling elements therebetween at first and second locations along said spindle with the inner races thereof surrounding the spindle, means fixing the outer races of the bearings relative to the tool housing; and means for axially biasing said inner races relative to said outer races to preload the rolling elements therebetween, said last-mentioned means being elastically yieldable axially of the spindle to accommodate thermal expansion of and other axial changes of dimension in said bearings and thereby keep said dimensional changes from creating excessive loads on the bearings; and means fixing said spindle to said motor output shaft for rotation therewith, the opposite ends of said spindle and said motor output shaft being terminated within and thereby aligned by the inner race of one of said bearings and the means connecting said spindle to said shaft comprising at least two pairs of aligned apertures in said spindle and said motor output shaft and pins spanning said spindle and said output shaft and fitted in said apertures.

10. A power tool comprising a housing; a motor having an output shaft, said motor being mounted in said housing; a spindle; means rotatably mounting said spindle in said housing in axial alignment with said motor output shaft comprising bearings at locations spaced along said spindle, there being plural bearings at one of said locations and each of said bearings comprising an outer race, an inner race surrounding the spindle, and rolling bearing elements between the inner and outer races; means fixing said outer races relative to said housing in the axial direction; and means for axially biasing said inner races relative to said outer races to preload the rolling elements therebetween, said means biasing all inner races of the bearings at said one location in the same direction relative to the outer races and the axial play of the inner races of all bearings at said one location relative to the outer races in the direction in which said inner races are biased being equal, whereby all of the bearings at said first location will be equally loaded; and means fixing said spindle to said motor output shaft for rotation therewith, the opposite ends of said spindle and said motor output shaft being terminated within and thereby aligned by the inner race of one of said bearings and the means connecting said spindle to said shaft comprising at least two pairs of aligned apertures in said spindle and said shaft and pins spanning said spindle and said shaft and fitted in said apertures.

11. The combination of a support structure; a component; and means for rotatably supporting said component in and from said support structure comprising bearings at locations spaced along said component, each said bearing comprising an outer race, an inner race surrounding the component, and rolling elements between the inner and outer races; means fixing said outer races relative to each other and to said support structure in the axial direction; and a Belleville spring means axially biasing said inner races relative to said outer races in the axial direction to preload the bearing elements therebetween in said axial direction and thereby accommodate thermal expansion of and other axial changes of dimension in said bearings and keep such dimensional changes from creating excessive loads on the bearings or from reducing the preload on the bearings to an unacceptable extent.

12. The combination of claim 11, wherein said Belleville spring means is located between said bearings at right angles and in surrounding relationship to said rotatably supported component.

13. The combination of claim 12, wherein said Belleville spring means comprises two Belleville springs disposed in mirror image relationship with their outer edges touching and their inner edges spaced apart.

14. The combination of claim 13 wherein the inner edge of one of said Belleville springs engages the inner race of the bearing at one of said locations and including a spacer surrounding the rotatably mounted component which extends between and engages the inner edge of the other of said Belleville springs and the inner race of the bearing at a second of said bearing locations.

15. The combination of claim 6, wherein the means for axially biasing the inner races of the bearings relative to the outer races thereof comprises a Belleville spring.

16. The combination of claim 15, wherein said Belleville spring means comprises a pair of Belleville springs surrounding and disposed transversely to said spindle in juxtaposed relationship and with their concave sides facing.

* * * * *

PO-1050
(5/69)

UNITED STATES PATENT OFFICE
CERTIFICATE OF CORRECTION

Patent No. 3,807,815             Dated April 30, 1974

Inventor(s) JACK KASABIAN

It is certified that error appears in the above-identified patent and that said Letters Patent are hereby corrected as shown below:

Column 8, Line 19, Change "8" to --7--.

Signed and sealed this 3rd day of December 1974.

(SEAL)
Attest:

McCOY M. GIBSON JR.             C. MARSHALL DANN
Attesting Officer               Commissioner of Patents